A. R. NEFF.
MILLING ATTACHMENT FOR LATHES.
APPLICATION FILED SEPT. 3, 1918.
1,299,759.
Patented Apr. 8, 1919.
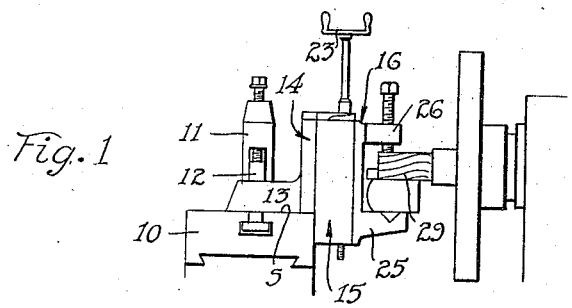
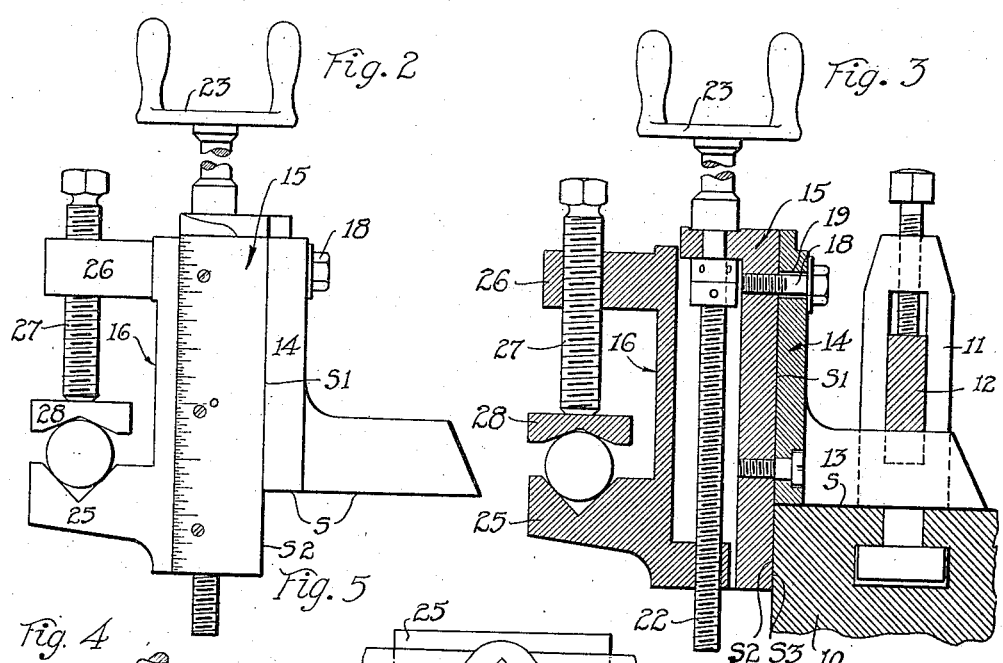
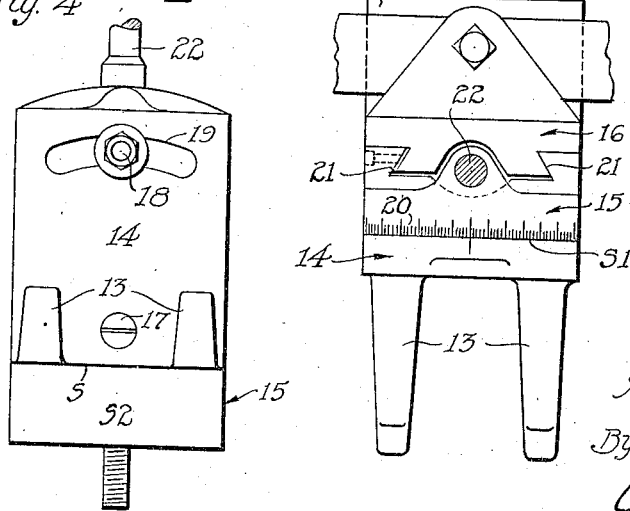
Inventor
Abner R. Neff
By James T. Barkelew
His Atty.

UNITED STATES PATENT OFFICE.

ABNER R. NEFF, OF LONG BEACH, CALIFORNIA, ASSIGNOR TO PASCHALL TOOL COMPANY, OF LONG BEACH, CALIFORNIA, A CORPORATION OF CALIFORNIA.

MILLING ATTACHMENT FOR LATHES.

1,299,759.   Specification of Letters Patent.   Patented Apr. 8, 1919.

Application filed September 3, 1918. Serial No. 252,292.

*To all whom it may concern:*

Be it known that I, ABNER R. NEFF, a citizen of the United States, residing at Long Beach, in the county of Los Angeles, State of California, have invented new and useful Improvements in Milling Attachments for Lathes, of which the following is a specification.

This invention relates to milling attachments for lathes such as those which are shown in the Paschall Patent No. 1,216,600, dated Feb. 20, 1917, and shown in application Serial No. 190,518, filed Sept. 10, 1917, by James H. Paschall, in a tool of the general character shown in said patent and application, my invention resides in certain improvements in structure and in detail, which improvements are herein specifically described. It is a general object of the present invention to make a strong and rugged tool; to make such a tool without increasing the expense of manufacture; and to make such a tool without modifying or complicating at all its distinctive simplicity of operation and use. The Paschall tools are distinctively simple, both as to construction and as to operation; and it is an object of this invention to keep intact such simplicity of construction and operation and at the same time to modify and improve the tool to increase its ruggedness and strength.

With these objects in view, the invention will be best understood from the following detailed description of a preferred form of device embodying the invention, reference being had for this purpose to the accompanying drawings in which—

Figure 1 is a small elevation showing the improved tool mounted in place on a lathe, said elevation being taken from the back side of the lathe; Fig. 2 is a front side elevation of the improved tool; Fig. 3 is a vertical central longitudinal section of the same; Fig. 4 is a rear end elevation of the tool and Fig. 5 is a plan of the improved tool.

In the drawings the numeral 10 designates the carriage, or some member of the carriage, of a lathe, and 11 designates the tool post thereof. (It will be understood that although in actual practice the attachment is mounted on the compound rest of the lathe carriage, I herein refer to it as being mounted on the lathe carriage, for simplicity and brevity of description and because the attachment is not necessarily limited to being mounted on the compound rest.) This milling attachment is constructed so as to be held down by a bar 12 held by the tool post and held across a pair of prongs 13 extending from the back side of the vertical base plate 14. In the previous tools this base plate 14 was made to extend a lower end below the under surface of the prongs 13; but I now make this base plate end at the under surface of the prongs 13; and the lower edge of the base plate and the under surface of the prongs is machined to a finished surface S which bears upon the upper surface of the lathe carriage 10; this surface being machined accurately at right angles to the vertical front face surface $S^1$ of the base 14. Upon this front vertical face surface $S^1$ a way member 15 is mounted; and upon the way member 15 a sliding work carrier member 16 is mounted. In the most approved form of tool the way member 15 is pivotally mounted upon base 14 so as to swing in a vertical plane against the vertical face surface of base 14; and then the work carrying member 16 is mounted to slide vertically in waves on the way member 15. This specific arrangement however, is not necessary to the present invention; but as the tool is preferably constructed in this manner I explain my invention as embodied in this specific form of tool. Accordingly, the way member 15 has a rear flat surface which bears against the face surface $S^1$ of the base, and the way member is pivoted on a pivot pin or screw 17. This pivot pin is preferably a shouldered screw which holds parts 14 and 15 in tight but workable engagement. In the upper part of member 15 there is a setting bolt 18 which passes through a slot 19 in base 14. Member 15 may be swung around pivot 17 and set in any desired position by the setting bolt 18; a circular scale graduation at 20 indicating the position of the swinging way member 15. Way member 15 has vertical ways 21 on its forward vertical face; and member 16 is adapted to slide vertically in those ways. A vertical screw 22, operated by handle 23, affords means for moving member 16 vertically; and the member 16 carries a work clamp of suitable form; preferably a lower clamp member 25 integral with member 16 and an upper member 26 carrying a clamp screw 27. The work is held in this clamp with the aid of a suitable clamping block 28, for operation by milling cutter 29 mounted in the lathe. The method of using the mechanism needs no description here, being fully described in the patent and application hereinbefore referred to. However, it is a peculiarity of this particular form of device that the member 15 (that is, the member which is mounted upon the front base surface of base member 14) falls back with its surface $S^2$ against the vertical surface $S^3$ of the lathe carriage. The base 14 does not hang over the front edge of the lathe carriage as heretofore; but the bottom edge of the base rests upon the upper surface F of the lathe carriage. This arrangement enables me to reduce the amount by which the whole tool overhangs the lathe carriage, thus making a strong arrangement; and at the same time it enables me to increase the weight and ruggedness of the parts 15 and 16. For instance, I increase the thickness of the parts 15 and 16 to an extent which makes these parts sufficiently strong to stand any severe usage to which the tool is put; and at the same time the work clamp does not overhang the edge of the carriage or smudge and is not as far from the base support, as has previously been the case. And, at the same time, the thickness and strength of the base plate 14 is substantially increased; but it will be seen that in this new position of the base plate an increase in thickness of the base plate does not affect the overhang of the tool in any manner. At the same time it will be seen that the member 15 is just as strongly supported as before—it has a back bearing surface as large in extent as it had in the previous construction. The result, in essence, is an increase in strength and rigidity and ruggedness of the tool, without any departure from its desired simplicity of construction and operation, and without any increase in the "overhang," and in fact with a material decrease in overhang. Furthermore, by the bearing of the back surface $S^2$ of member 15 against the carriage, I provide a simple and easy means and method of "squaring" the tool in proper alinement and of keeping it in that proper alinement when once set.

Having described a preferred form of my invention, I claim;

1. A lathe attachment, embodying a vertical base plate having a vertical front face and a bottom face at right angles thereto, said bottom base adapted to rest upon the upper face of the lathe carriage and said front face adapted to be alined with the front vertical face of a lathe carriage, a way member movably mounted upon and against said front face of the base, said way member extending on down below the base and bearing against the vertical face of the carriage, and a work carrying member movably mounted upon said way member.

2. A lathe attachment, embodying a vertical base plate having a vertical forward face adapted to be alined with a vertical face of a lathe carriage and having a bottom face at right angles to its forward face adapted to be held upon the upper horizontal base of the lathe carriage, a swingingly adjustable member mounted pivotally upon said base plate, the point of pivoting being near the lower end of the base plate, said swinging member having a vertical back face bearing against substantially the whole of the forward face of the base plate, and said swinging member extending on down below the base plate and the lower part of said vertical back surface of said swinging member bearing back against the vertical face of the lathe carriage; and a work carrying member slidably mounted upon said swinging member.

3. A lathe attachment, embodying a vertical base plate having a vertical front face and a bottom face at right angles thereto, said bottom face adapted to rest upon the upper face of the lathe carriage and said front face adapted to be alined with the front vertical face of a lathe carriage, said base plate including a rearwardly extending anchoring means adapted to be held down upon the lathe carriage by means of the lathe carriage tool post, a way member movably mounted upon and against said front face of the base, said way member extending on down below the base and bearing against the vertical face of the carriage, and a work carrying member movably mounted upon said way member.

4. A lathe attachment, embodying a vertical base plate having a vertical forward face adapted to be alined with a vertical face of a lathe carriage and having a bottom face at right angles to its forward face adapted to be held upon the upper horizontal base of a lathe carriage, said base plate including a rearwardly extending anchoring means adapted to be held down upon the lathe carriage by means of the lathe carriage tool post, a swingingly adjustable member mounted pivotally upon said base plate, the point of pivoting being near the lower end of the base plate, said swinging member having a vertical back face bearing back against substantially the whole of the forward face of the base plate, and said swinging member extending on down below the base plate and the lower part of said vertical back surface of said swinging member bearing back against the vertical face of the lathe carriage; and a work carrying member slidably mounted upon said swinging member.

In witness that I claim the foregoing I have hereunto subscribed my name this 26th day of July, 1918.

ABNER R. NEFF.

Witness:
VIRGINIA I. BERINGER.

Copies of this patent may be obtained for five cents each, by addressing the "Commissioner of Patents, Washington, D. C."